United States Patent [19]

Katoh et al.

[11] Patent Number: 6,000,311

[45] Date of Patent: Dec. 14, 1999

[54] CUTTING VALVE

[75] Inventors: Hiromi Katoh; Hidehiko Yasuta, both of Yokohama, Japan

[73] Assignee: Kabushiki Kaisha Toshiba, Kawasaki, Japan

[21] Appl. No.: 08/791,622

[22] Filed: Jan. 31, 1997

[30] Foreign Application Priority Data

Jan. 31, 1996 [JP] Japan .................................. 8-015655

[51] Int. Cl.⁶ .................................................... B26D 5/08
[52] U.S. Cl. .......................................... 83/639.4; 83/580
[58] Field of Search .................................. 83/639.4, 580

[56] References Cited

U.S. PATENT DOCUMENTS

| | | | |
|---|---|---|---|
| 2,140,338 | 12/1938 | Temple, Jr. ............................. | 83/639.4 |
| 3,885,484 | 5/1975 | Sturgis ................................... | 83/639.4 |
| 3,886,842 | 6/1975 | Giebel et al. ........................... | 83/639.4 |
| 3,895,552 | 7/1975 | Lagofun ................................. | 83/639.4 |
| 3,915,043 | 10/1975 | Smith et al. ........................... | 83/639.4 |
| 4,826,103 | 5/1989 | McKown ............................... | 83/639.4 |

FOREIGN PATENT DOCUMENTS

| | | | |
|---|---|---|---|
| 847208 | 10/1939 | France ................................... | 83/639.4 |
| 2317930 | 2/1974 | Germany ............................... | 83/639.4 |
| 4-240593 | 8/1992 | Japan. | |

*Primary Examiner*—Rinaldi I. Rada
*Assistant Examiner*—Sean Pryor
*Attorney, Agent, or Firm*—Oblon, Spivak, McClelland, Maier & Neustadt, P.C.

[57] ABSTRACT

A cutting valve, for example, for a transversing incore probe system, comprises a valve box, a cylinder formed to the valve box, a piston disposed in the cylinder to be slidable therein, a cutting blade mounted to one end of the piston, a powder plug which is provided to another end of the piston and in which a powder is filled up, the powder being exploded by the operation of the powder plug, and a through hole, through which a cable or wire to be cut by the cutting blade penetrates, formed to the cylinder so as to extend in a direction normal to the sliding direction of the piston and to communicate with an inside of the cylinder. The piston is slid together with the cutting blade in an accelerated manner at a time when the powder is exploded. A kind and an amount of the powder are predetermined so that the piston is accelerated in the sliding motion in the cylinder at a speed of more than 40 m/sec. by a pressure at the time of exploding the powder and the cutting blade is formed of a material such as austenite stainless steel having a hardness less than that of a material forming the cable such as piano wire.

7 Claims, 4 Drawing Sheets

CUTTING VALVE

BACKGROUND OF THE INVENTION

The present invention relates to a cutting valve of a valve assembly particularly of a transversing incore probe system (called hereinlater TIP) for calibrating an output area neutron detector disposed in, for example, a boiling water reactor (BWR) and adapted to monitor an incore neutron flux in a reactor core.

FIG. 2 is a view showing an entire structure of the TIP to be disposed in the BWR, and with reference to FIG. 2, in the BWR, there are arranged a plurality of output area neutron detector assemblies 2 disposed to predetermined portions in a reactor pressure vessel (RPV) 1, calibrating tubes 3 disposed in these neutron detector assemblies 2, detector guide tubes 4 connected to lower ends of the calibrating tubes 3, indexing devices 5 connected to the detector guide tubes 4, isolation valve units 8 including ball valve units 8a and cutting valves 8b and connected to outside portions of a reactor containment vessel 7 through a flanged portion 6, shielding vessels 9 connected to the isolation valve units 8 through the detector guide tubes 4, and detector drive devices 10 connected to the shielding vessels 9 through the guide tubes 4.

Accordingly, the TIP detector advances in the detector guide tube 4 by a distance corresponding to a feed-out detector cable length. When the TIP detector is fed out from the shielding vessel 9, the ball valve 8a of the isolation valve unit 8 is opened, the TIP detector is then guided into the reactor containment vessel 7 through the isolation valve unit 8 and the penetrating flange 6 and, finally, stops at the core top portion of the calibration tube 3. Thereafter, the TIP detector is pulled out for measuring the neutron flux in the RPV 1.

Incidentally, when any abnormal condition occurs in the reactor, an isolation signal is generated to close all the isolation valve units 8 in the reactor containment vessel 7. However, in the state that the detector cable passes through the ball valve 8a, the ball valve 8a cannot be closed.

In such state, a cutting blade mounted to the cutting valve 8b is operated to cut the detector cable passing the cutting valve 8b, and simultaneously, the cutting valve 8b is sealed by the cutting blade to thereby isolate and seal the penetrating portion of the TIP system.

FIG. 5 shows a structure of one conventional cutting valve 8b, in which a cylinder 12 is disposed in a valve box 11 and a piston 14, to which a cutting blade 13 is mounted to be directed downward, as viewed, is accommodated in the cylinder 12, and a powder plug 16 in which an explosive powder 15 is filled up is disposed to an opening of the cylinder at a portion above the piston 14.

A valve seat 21 is disposed below the cylinder 12, and a through hole 17 through which the detector guide tube 4 passes is formed below the cylinder 12 so as to extend in a direction normal to the cutting blade 13. The detector guide tube 4 is inserted into the through hole 17 and the outer peripheral side of the guide tube 4 are fixed to the through hole 17 by mounting a guide tube inlet plug 18 and a guide tube outlet plug 19 to the valve box 11 and the valve seat 21 at inlet and outlet sides of the through hole 17, respectively. Thus, it may be said that the valve box 11 serves also as a holder for holding the detector guide tube 4. A detector cable 20 is inserted into the inside portion of the detector guide tube 4.

In the structure of the cutting valve described above, when the cutting blade 13 is driven, the powder 15 is exploded by current conduction to a coil, not shown, disposed in the powder 15 in the powder plug 16 to cause an explosive pressure, by which the piston 14 is slid downward in the cylinder 12 and the cutting blade 13 is driven and moved towards the detector guide tube 4, whereby both the detector guide tube 4 and the detector cable 20 inserted therein are cut together. In this operation, the front end of the cutting blade 13 abuts against the valve seat 21 in a manner that the side portion of the cutting blade 13 closes the through hole 17.

The cutting blade 13 is formed of a material having high hardness such as hot tool steel (SKD-12) for cutting both the detector guide tube 4 formed of a stainless steel and the detector cable 20 formed of a piano wire.

By the way, when a reactor accident occurs, a temperature inside the reactor containment vessel rises to about 171° C., and at the same time, a temperature of the cutting valve 8b mounted to a portion near the penetrating flange 6 of the reactor containment vessel 7 also rises to near the same temperature. For this reason, the cutting blade 13 is formed of the hot tool steel having a large hardness such as SKD-12 for cutting both the detector guide tube 4 formed of a stainless steel and the detector cable 20 formed of a piano wire even if the hardness of the cutting blade 13 is lowered by such high temperature.

In usual, an operation test has been performed by exploding the powder 15 for confirming the function of the cutting valve 8b once in several years. However, the operation test has been carried out under an ordinary, i.e. room, temperature, the cutting blade 13 may be broken because of its hardness and the sealing performance thereof may be lowered. Accordingly, in order to prevent the cutting blade 13 from breaking, it is necessary in the operation test to create an atmosphere having substantially the same temperature as that in the reactor containment vessel 7 at which an accident will occur in the reactor by disposing a high temperature tank or the like in a reactor power plant.

As discussed above, in order to carry out the operation test for the conventional cutting valve 8b, it is necessary to convey the high temperature tank in the reactor power plant, requiring much labor, and moreover, in such operation test, workers must perform the operation test under the severe high temperature environment, providing a troublesome problem.

SUMMARY OF THE INVENTION

An object of the present invention is to substantially eliminate defects or drawbacks encountered in the prior art described above and to provide a cutting valve, particularly for a transversing incore probe system capable of carrying out an operation test under a room temperature.

This and other objects can be achieved according to the present invention by providing a cutting valve which comprises a valve box, a cylinder formed to the valve box, a piston disposed in the cylinder to be slidable therein, a cutting blade mounted to one end of the piston, a powder plug which is provided to another end of the piston and in which a powder is filled up, the powder being exploded by the operation of the powder plug, and a through hole, through which a cable means to be cut by the cutting blade penetrates, formed to the cylinder so as to extend in a direction normal to the sliding direction of the piston and to communicate with an inside of the cylinder, the piston being slid together with the cutting blade at a time when the powder is exploded, the improvement in which a kind and an amount of the powder are predetermined so that the piston is accelerated in the sliding motion in the cylinder at a speed of more than 40 m/sec., preferably more than 50 m/sec., by a pressure at the time of exploding the powder and the cutting blade is formed of a material having a hardness less than that of a material forming the cable means.

In preferred embodiments, the cutting blade is disposed in the cylinder at a portion apart from the cable means inserted into the through hole by a distance more than 6 mm.

The cutting blade is formed of an austenite stainless steel material, and the cable means is formed of a piano wire.

A guide tube is further disposed in the through hole so as to extend therethrough and the guide tube is formed of a material of ethylene tetrafluoride resin.

The piston is slid in the cylinder so as to close one opening of the through hole opened to the cylinder.

According to the present invention of the characters described above, when the powder in the powder plug is exploded, the piston is slid in the cylinder at an accelerated speed and then the cutting blade mounted to the piston cuts the cable means and close the opening of the through hole air-tightly. In this operation, since the cutting blade is formed of a material such as austenite stainless steel which has a hardness less than that of the cable means such as piano wire, the cutting blade is not damaged even if the operation test is performed at a room temperature, eliminating the working at a high temperature. Since the cutting blade is slid at a speed more than 40 m/sec., the cut condition of the cable means can be improved so as to provide a smooth cut surface.

Furthermore, although the cutting blade is formed of a material having a hardness less than that of the cable means to be cut, the hardness of the cutting blade can be increased several times by the cutting speed thereof more than 40 m/sec., thus finely cutting the cable means. The use of the austenite stainless steel material makes free from the corrosion of the cutting blade, reducing the necessity for the periodical exchanging thereof.

The use of the guide tube formed of ethylene tetrafluoride resin can reduce the amount of the powder to be used, increasing safeness in the operation test.

The nature and other features of the present invention will be made more clear from the following descriptions made with reference to the accompanying drawings.

DESCRIPTION OF THE PREFERRED EMBODIMENT

A preferred embodiment of the present invention will be described hereunder with reference to the accompanying drawings.

Figure 1:
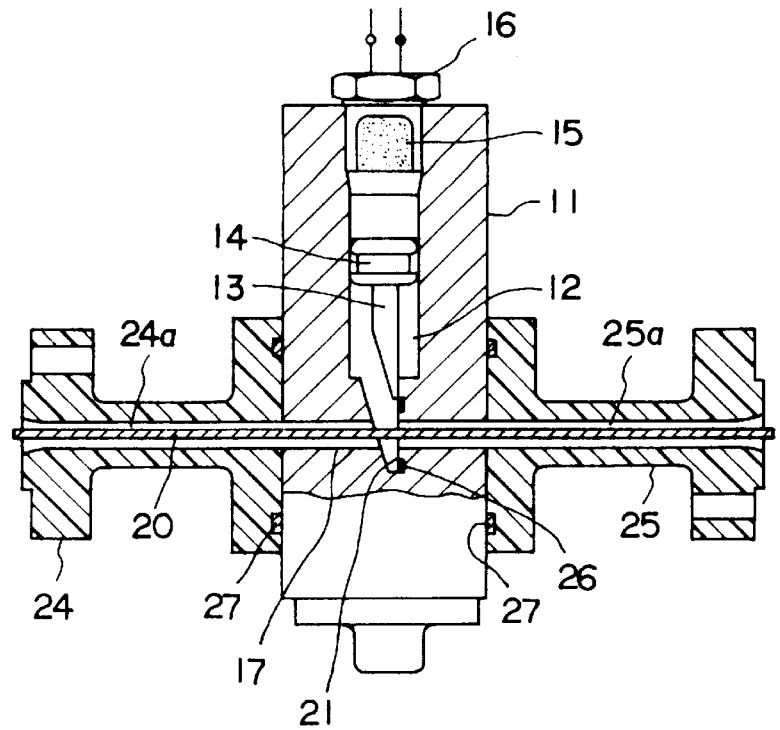
FIG. 1 is an elevational section representing one embodiment of a cutting valve according to the present invention.
Figure 5:
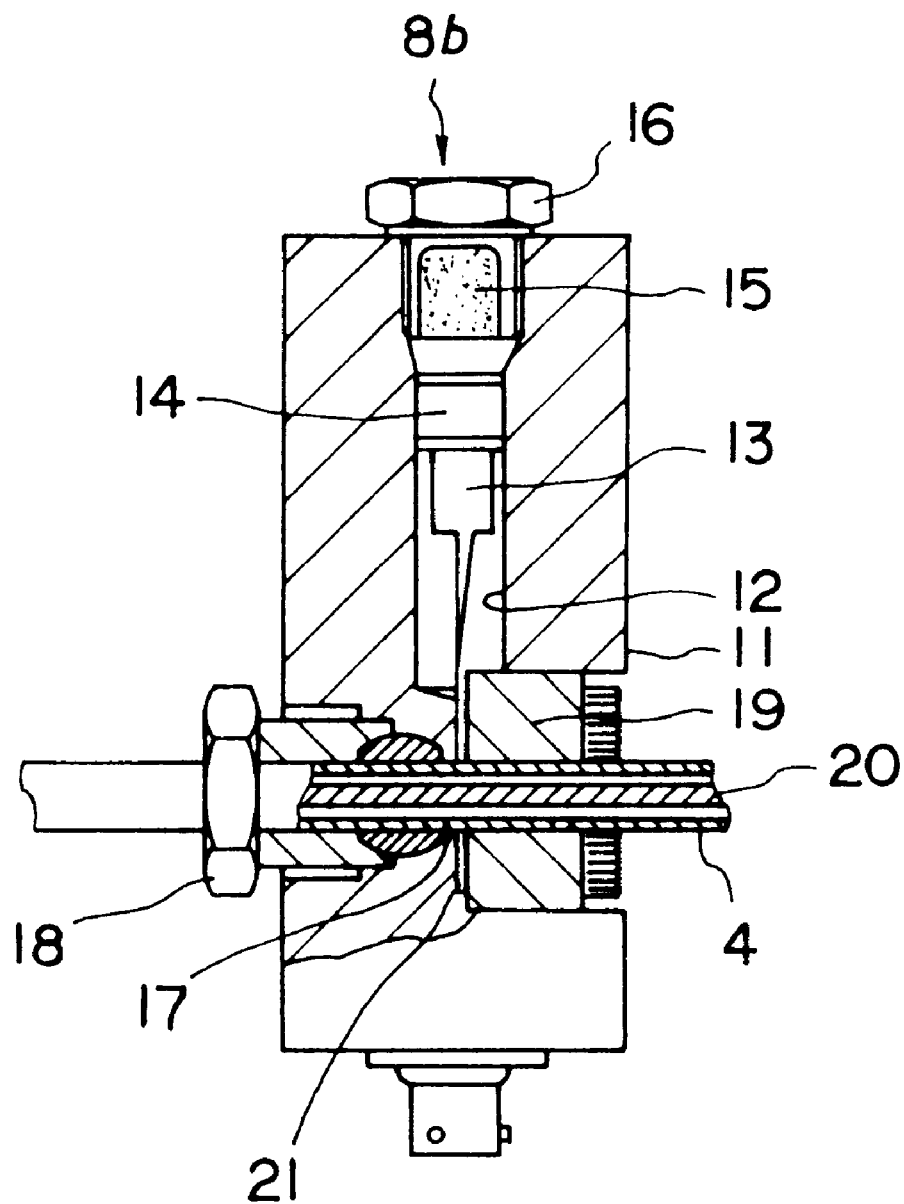
FIG. 5 is an elevational section of a cutting valve having a conventional structure.

FIG. 1 is an elevational section representing one embodiment of a cutting valve applied to an incore prove system of a reactor, in which like reference numerals are added to members or elements corresponding to those shown in FIG. 5 mentioned with reference to the structure of the conventional cutting valve.

Referring to FIG. 1, in a cutting valve of this embodiment, the piston 14 is pushed towards the upper end opening of the cylinder 12 of the valve box 11, and to the upper end opening thereof, is fitted the powder plug 16 filled up with the powder 15. The powder 15 is exploded by the current conduction to a coil, not shown, disposed in the powder 15. The cylinder 12 is arranged in the valve box 11 and the piston 14 is accommodated in the cylinder 12. The piston 14 has a lower end, as viewed, to which the cutting blade 13 is mounted.

A through hole 17 is formed to the lower portion, as viewed, of the cylinder 12 in the valve box 11 so as to extend in a direction perpendicular to the cutting blade 13 and communicate with the cylinder 12, and a valve seat 21 is disposed to the lower surface of the through hole 17 or below the same.

Opposing inlet and outlet flanges 24 and 25 acting as joints of the detector guide tube 4 are fixed to both the side of the valve box 11, and the inlet and outlet flanges 24 and 25 are formed with through holes 24a and 25a, respectively, communicating with the through hole 17 of the valve box 11. The detector guide tube 4 may be preferably formed of an ethylene tetrafluoride resin as mentioned hereinlater. A detector cable 20 formed of a piano wire is disposed in the through holes 17, 24a and 25a so as to extend therealong.

A valve seat 26 is disposed between the lower portion of the cylinder 12 and the valve seat 21 so as to seal the through hole 17 at a time when the cutting blade 13 is lowered. Gaskets 27, 27 are disposed to the contacting surfaces between the valve box 11 and the inlet flange 24 and the outlet flange 25, respectively, to maintain air tightness.

In the present embodiment, the cutting blade 13 is formed of a material having a hardness lower than that of the material forming the detector cable, and for example, a stainless steel of austenite series is preferably utilized.

A distance between the front end of the blade 13 and the detector cable 20 is set to a value more than 6 mm. The piston 14 is pressed by a high pressure gas generated at a time when the powder 15 is fired in the cylinder 12 to cause the accelerated sliding motion in the cylinder 12 at the sliding speed of more than 40 m/sec, preferably of about 50 m/sec, whereby the cutting blade 13 reaches the detector cable 20 and collides therewith at a high speed.

The cutting valve of an probe proved system of the present embodiment of the structure described above will operate in the following manner.

Figure 2:
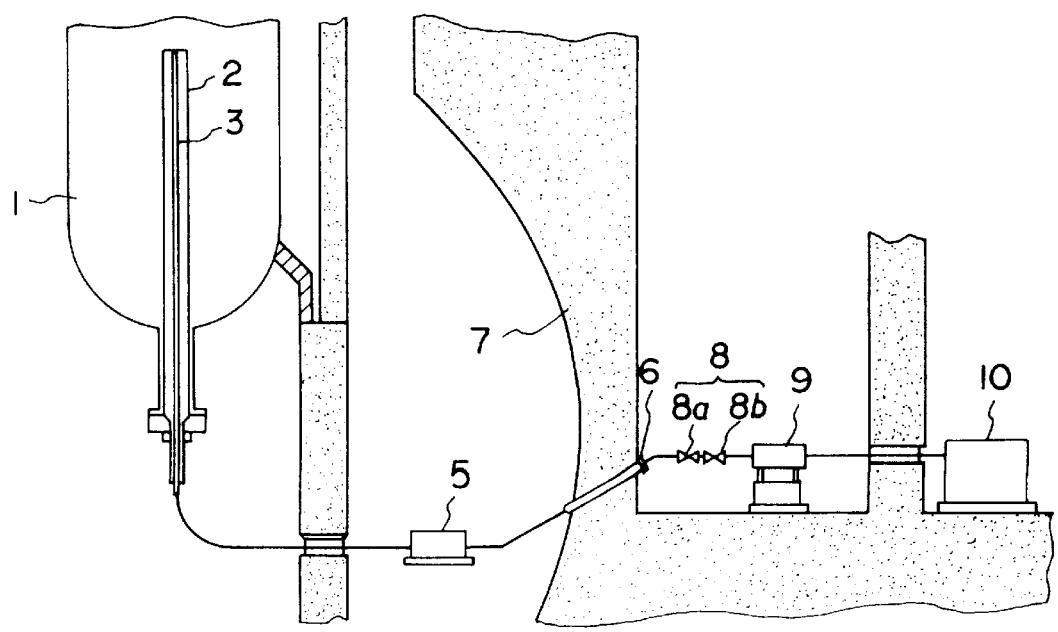
FIG. 2 is a schematic view showing an arrangement of a transversing incore probe system disposed in a boiling water reactor provided with the cutting valve of FIG. 1.

With reference to FIG. 2, the detector cable 20 fed by the operation of the detector drive device 10 passes the shielding vessel 9 and the isolation valve unit 8 including the ball valve 8a and the cutting valve 8b and is then inserted into the calibration tube 3 through the indexing device 5. At this time, when a reactor containment vessel isolation signal is generated, the detector driving device 10 is automatically operated to pull out the detector cable 20. In this time, however, when any fault is caused to the detector drive device 10, the detector cable 20 cannot be pulled out, and hence, the ball valve 8a in the isolation valve unit 8 cannot be closed.

On such accident, the powder 15 is exploded through the current conduction to the coil disposed in the powder 15 in the powder plug 16, and the piston 14 is then pushed forward by the high pressure gas generated through the explosion of the powder 15. The piston 14 is slid downward, as viewed, in the cylinder at the accelerated speed of more than 40 m/sec. In this occasion, the front end of the blade 13 positioned at a portion apart from the detector cable by more than 6 mm reaches in a moment the detector cable 20 with the hardness hardened several times at the colliding time in accordance with the principle of material speed dependency and the cutting blade 13 cuts the detector cable 20. After the cutting of the detector cable 20, the front end of the cutting blade 13 abuts against the valve seat 21 and, in this state, the through hole 17 is closed by the side portion of the cutting blade 13 to achieve the air tight sealing.

In the above operation, in the case where the distance between the cutting front end of the cutting blade 13 and the detector cable 20 is less than 6 mm, it is impossible for the piston 14 to be slid in the cylinder at the accelerated sliding speed of more than 40 m/sec. As a result, the detector cable 20 cannot be cut by the cutting front end of the cutting blade 13. Even if the detector cable 20 can be cut, the cut end of the detector cable 20 is made coarse and, hence, the side portion of the cutting blade 13 cannot close sufficiently airtightly the through hole 17.

On the other hand, in the case where the distance between the cutting front end of the cutting blade 13 and the detector cable 20 is less than 6 mm, it may be possible to increase the amount of the powder 15 in the powder plug 16 to increase the piston sliding speed to more than 40 m/sec. However, in such case, the increased amount of the powder 15 will cause a dangerous condition and, in an adverse case, the cutting valve itself may be damaged or broken.

According to the embodiment described above, since the cutting blade 13 is formed of the stainless steel of austenite series having hardness less than that of the material forming the detector cable 20 formed from the piano wire, the cutting blade 13 is not damaged or broken even if the operation test of the cutting valve is performed at the normal room temperature, and accordingly, workings in an adverse high temperature condition can be eliminated. Furthermore, since the austenite series stainless steel is utilized, the cutting blade 13 is free from corrosion and it is not necessary to periodically exchange the cutting blade, and the necessity of periodical inspection can be also eliminated.

Still furthermore, since the distance between the cutting front end of the cutting blade 13 and the detector cable 20 is set to a value of more than 6 mm, the moving speed of the cutting blade 13 becomes more than 40 m/sec. As a result, the hardness of the cutting blade 13 becomes several times of that of the usual state in accordance with the material speed dependency principle at the colliding time, thereby cutting the detector cable 20 having the hardness higher than that of the cutting blade 13 and the through hole 17 can be closed with a desired air tightness by the side portion of the cutting blade 13.

In a modification in which the detector guide tube 4 penetrates the through hole 17 of the valve box 11 and the detector cable 20 penetrates the guide tube 4, both the detector cable 20 and the guide tube 4 are cut together. In this modification, gaskets 27 are interposed between the valve box 11 and the inlet and outlet flanges 24 and 25 to maintain the air-tightness. According to this arrangement, it is not necessary to form the guide tube 4 of a stainless steel as in the conventional example, and the guide tube 4 may be formed of such as ethylene tetrafluoride resin (PTFE). In this case, the cutting resistance is reduced, so that substantially no influence is applied to the cutting speed, whereby the cutting force of the cutting blade 13 can be made small, thus reducing the amount of the powder.

Experiments for showing the priority of the present invention were carried out and the results thereof will be described hereunder.

The piano wire material usually has a hardness of about HRC 120 (about four times that of austenite stainless steel) (Japan Industrial Standard (JIS), H: Hardness, R: Rockwell equation, C: Scale), an alloy tool steel has a hardness of about less than HRC 60, and an austenite stainless steel has a hardness of about less than HRC 30.

Figure 3:
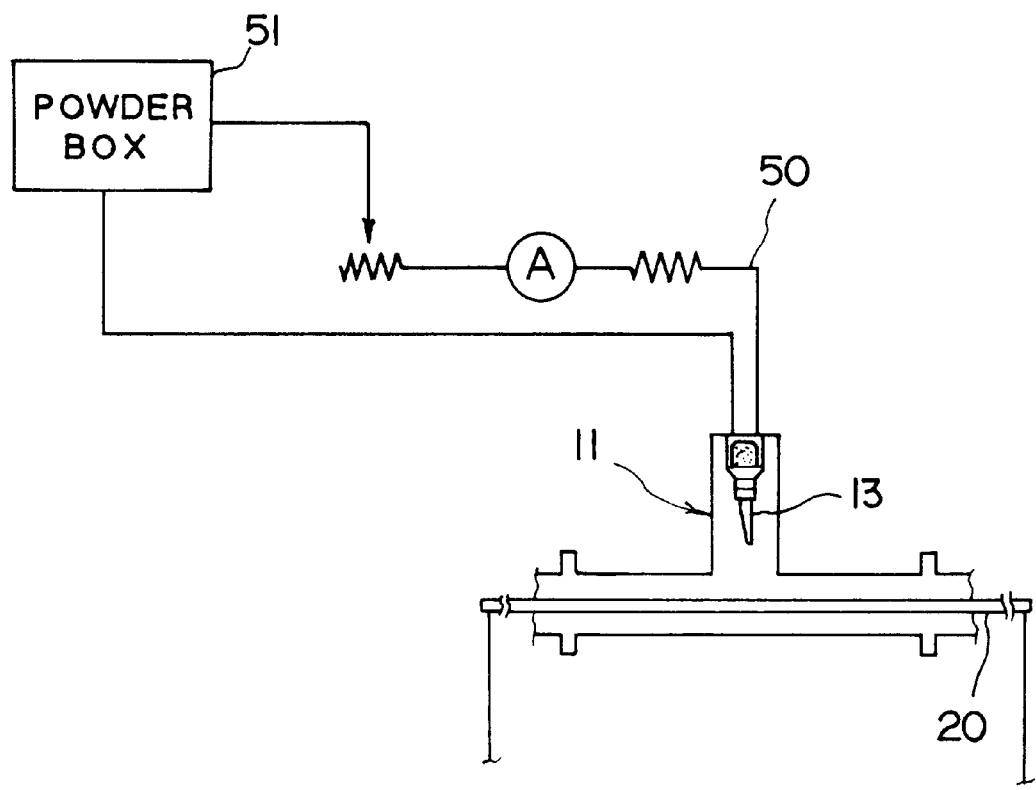
FIG. 3 is an illustration of an arrangement for driving the cutting valve.

At the experiments, such an equipment as illustrated in FIG. 3 was used, and in this experiment, the powder box was disposed outside the valve body. In the illustrated arrangement, when a current is conducted through a wire 50, the powder in the powder box 51 is fired and the cutting blade 13 in the valve box 11 is then driven towards the cable 20 at various speeds.

Table 1 shows a result in the experiment in which the cutting blade was formed of the austenite stainless steel material according to the present invention and the cutting blade was driven by various speeds by adjusting the amount of the powder and the kind of the powder.

Table 2 shows a result in the experiment in which various materials were used for the cutting blades other than the example of the present invention utilizing the austenite stainless steel. The cutting blades were subjected to surface treatments and each having a blade front end thickness of 1 mm.

TABLE 1

| Inspection item | Sample | | | | |
| --- | --- | --- | --- | --- | --- |
|  | 1 | 2 | 3 | 4 | 5 |
| Cutting speed | 35 m/sec. | 40 m/sec. | 53 m/sec. | 63 m/sec. | 59 m/sec. |
| Kind and amount of powder | CK6528 80 mg | CK6528 150 mg | CK6528 300 mg | CK6528 450 mg | HMX 150 mg |
| Cut condition | cut | cut | cut | cut | cut |
| Seal performance | leak | no leak | no leak | no leak | no leak |

TABLE 2

| Test examples | Cutting blade material | Surface treatment | Whether cable is cut(○) or not(x)? | Whether cutter blade is damaged(x) or not(○)? | Whether cable is smoothly cut(○) or not(x)? |
| --- | --- | --- | --- | --- | --- |
| Ex. 1 (present invention) | Austenite stainless steel | No quenching (less than HRC30) | ○ | ○ | ○ |

TABLE 2-continued

| Test examples | Cutting blade material | Surface treatment | Whether cable is cut(○) or not(x)? | Whether cutter blade is damaged(x) or not(○)? | Whether cable is smoothly cut(○) or not(x)? |
|---|---|---|---|---|---|
| Comparative Ex. 1 | Alloy tool steel (SKS3) | Totally quenching (more than HRC60) | ○ | x | ○ |
| Comparative Ex. 2 | Carbon Steel (S45C) | Hard Chrome Plating on only surface (less than HRC30) | ○ | ○ | x |
| Comparative Ex. 3 | Carbon Steel (S45C) | Surface quenching | ○ | x | ○ |

As can be seen from the Table 1, according to the present invention, in which the cutting blade was formed of the austenite stainless steel and the cutter blade was driven at a speed more than 40 m/sec., the cable can be cut with smooth cut surface of the cable. In examples other than the present invention, the cable was cut, but the cut surface was not smooth to sufficiently seal the through hole formed to the cutting valve through which the cable to be cut is inserted.

As also can be seen from the Table 2, the cutting blade formed of the material according to the present invention can cut the cable with smooth cut surface, thus achieving an excellent sealing performance with no leak, and the cutting blade was not damaged or broken.

Although the above-mentioned embodiment is described with reference to a case applied to the incore probe system, the cutting valve of the present invention, in which the cutting blade is formed of a material having a hardness lower than that of a cable to be cut, may be utilized as a wire cutter in another example.

For example, in a long line fishing, when a large drift wood or the like is interwinded to a fishing net or a large load is applied to a drag net and a navigation of a fishing ship is in a dangerous state, it is necessary to urgently cut the wire or cable of the fishing net or drag net.

In the known art, in such case, the fishing ship is provided with a wire cutter for cutting the wire or cable of the fishing net by utilizing a powder likely as mentioned in the former embodiment as a valve cutter, in which the wire or cable is cut by hitting the cutting blade by the explosion force of the powder at a high speed. However, many fishing spots usually reside in extremely cold regions at which atmospheric temperature is in a certain case below –20° C. In such environment, when it becomes necessary to cut the wire or cable of the fishing net and the cutting blade formed of carbon steel material such as SKD is used, the cutting blade may be easily broken or damaged because of the cold temperature.

In such example, the present invention will be effectively applicable.

Figure 4:
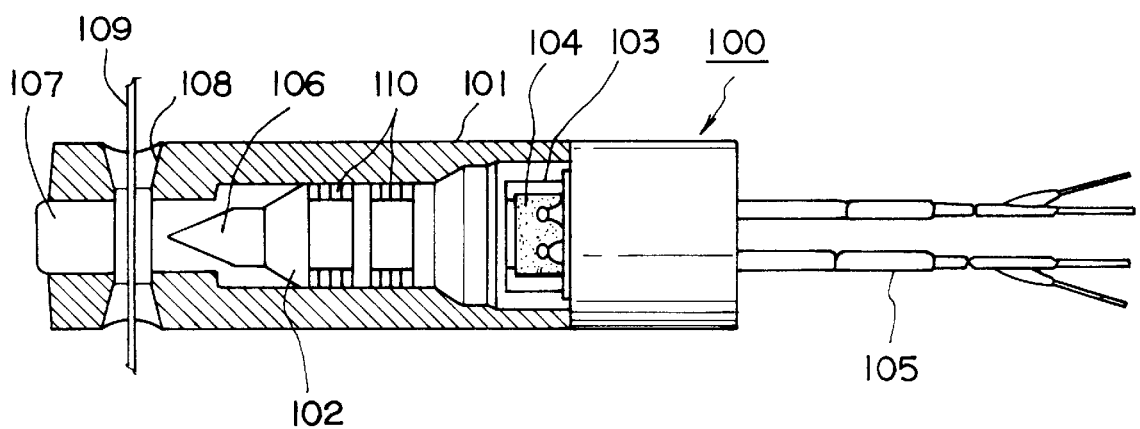
FIG. 4 is a sectional view of a cutting valve as a wire cutter according to another embodiment of the present invention.

That is, FIG. 4 shows a sectional view of a cutting valve used as a wire cutter for cutting a wire or cable of a fishing net such as in a long line fishing.

Referring to FIG. 4, a wire cutter 100 as the cutting valve comprises a cutter body 101 having substantially a cylindrical shape having an inner hollow portion, a cutter 102 disposed in the cutter body 101, a powder box 103 which is disposed in the cutter body 101 and in which a powder 104 fills, and an electric wire 105 connected to the powder box 103 to fire the powder 104. Seal members 110 such as O-rings are disposed between the cutter 102 and the inside surface of the valve body 101.

The cutter 102 has a cutting blade 106 in its front end, right end as viewed. A blade receiver 107 is fitted to the front end opening of the cutter body 101 and the other end, left end as viewed, of the cutter body 101 is closed through which the electric wire 105 extends in the cutter body 101 to the powder box 103. The cutter body 101 is formed with a through hole 108 at its front end portion through which a wire or cable 109 to be cut of a fishing net, not shown, is inserted.

The general structure of such wire cutter shown in FIG. 4 is known in the art and the use of the powder for driving the cutting blade is also known. However, in the present invention, the cutting blade is formed of an austenite series stainless steel material as in the former embodiment. The austenite material is not broken or damaged in the cold temperature, so that even if the cutting blade collides with the wire, having a hardness more than that of the cutting blade, of the fishing net at high speed, the cutting blade is not damaged or broken with high impact force, thus being advantageous.

It is to be noted that the present invention is not limited to the described embodiments and many other changes or modifications may be made without departing from the scope of the appended claims.

What is claimed is:

1. A cutting valve which comprises a valve box, a cylinder formed to the valve box, a piston disposed in the cylinder to be slidable therein, a cutting blade mounted to one end of the piston, a powder plug which is provided to another end of the piston and in which a powder is filled up, said powder being exploded by the operation of the powder plug, and a through hole, through which a cable means to be cut by the cutting blade penetrates, formed to the cylinder so as to extend in a direction normal to a sliding direction of the piston and to communicate with an inside of the cylinder, said piston being slid together with the cutting blade at a time when the powder is exploded, wherein a kind and an amount of said powder are predetermined so that said piston is accelerated in the sliding direction in the cylinder at a speed of more than 40 m/sec. and less than 65 m/sec. by a pressure at the time of exploding the powder and said cutting blade is formed of a material having a hardness less than that of a material forming the cable means.

2. A cutting valve according to claim 1, wherein said cutting blade is disposed in the cylinder at a portion apart from the cable means inserted into the through hole with a distance more than 6 mm.

3. A cutting valve according to claim 1, wherein said cutting blade is formed of an austenite stainless steel material.

4. A cutting valve according to claim 3, wherein said cable means is formed of a piano wire.

5. A cutting valve according to claim 1, wherein a guide tube is further disposed in the through hole so as to extend therethrough and said guide tube is formed of a material of ethylene tetrafluoride resin.

6. A cutting valve according to claim 1, wherein said piston is accelerated in the sliding motion in the cylinder at a speed preferably of more than 50 m/sec. by a pressure at the time of exploding the powder.

7. A cutting valve according to claim 1, wherein said piston is slid in the cylinder so as to close one opening of the through hole opened to the cylinder.

* * * * *